UNITED STATES PATENT OFFICE.

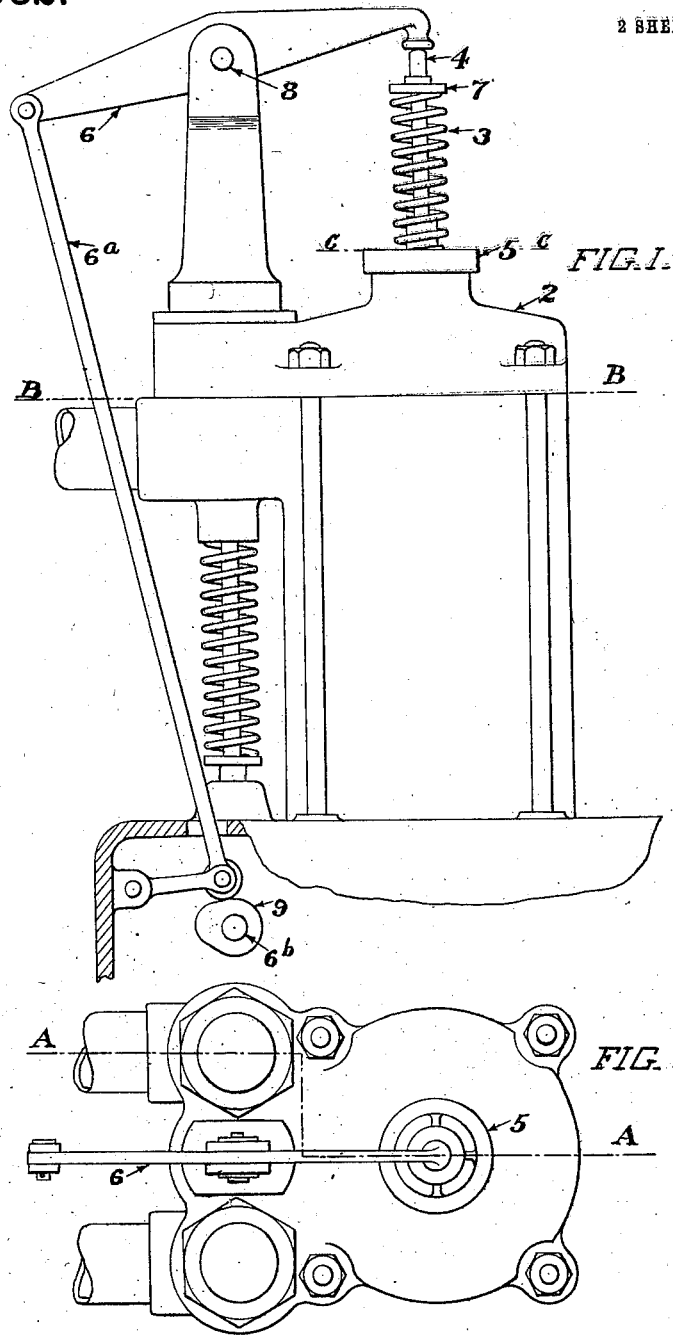

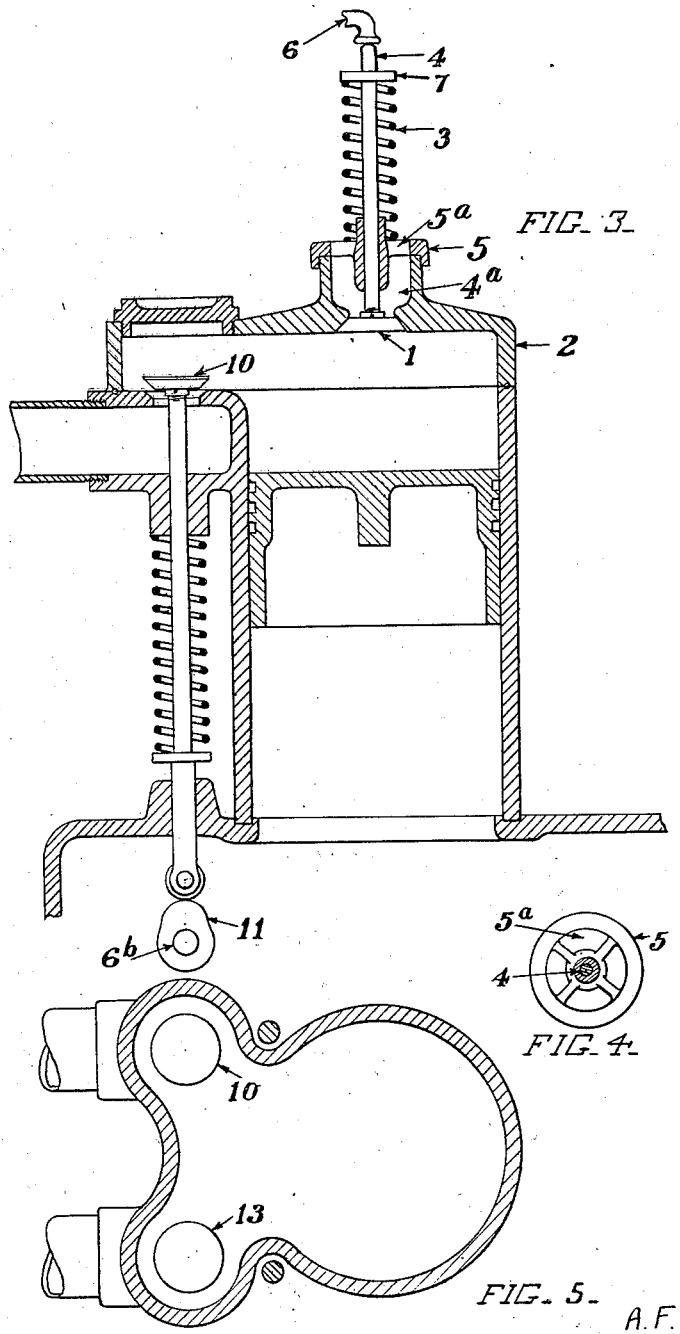

ARTHUR FLOYD COLLINS AND ALEXANDER KERR, OF CHRISTCHURCH, AND ALBERT EDWARD RUSSELL, OF WELLINGTON, NEW ZEALAND.

INTERNAL-COMBUSTION ENGINE.

1,082,932. Specification of Letters Patent. Patented Dec. 30, 1913.

Application filed May 21, 1913. Serial No. 769,086.

*To all whom it may concern:*

Be it known that we, ARTHUR FLOYD COLLINS and ALEXANDER KERR, residing at Oxford Terrace, Christchurch, in the Provincial District of Canterbury, in the Dominion of New Zealand, and ALBERT EDWARD RUSSELL, residing at Harris street, Wellington, in the Provincial District of Wellington, New Zealand, all citizens of the Dominion of New Zealand, have invented certain new and useful Improvements in Internal-Combustion Engines, of which the following is a specification.

This invention provides improved means for cooling and decarbonizing the combustion chambers and cylinders of internal combustion engines, and consists in providing a valve and means for operating the same whereby a charge of air is admitted to the combustion chamber and cylinder during the outward stroke of the piston, the air so admitted being expelled during the inward stroke of the piston. By this invention a much higher crank shaft speed is obtainable for a given number of explosions, while the charge of air entering and exhausting not only insures the interior of the combustion chamber remaining cool and clean, but also permits a full charge of fresh gas being admitted and thereby rendering the explosion of higher value than heretofore. This result is obtained because of the fact that the residue left from a previous explosion is entirely removed by the exhaust air before fresh gas is admitted.

The apparatus heretofore in common use for cooling the cylinder and comprising a water tank, pump, radiator fan, or the like are dispensed with. The valve through which the air is admitted and exhausted, is preferably located at the upper end of the gas engine, as illustrated. The cam for operating the valve is timed to give an impulse to the valve for the air admission and exhaust.

The drawing herewith illustrates the preferred embodiment of the invention.

Figure 1, is a front elevation, and Fig. 2, a plan of a cylinder made according to the invention, Fig. 3, is a sectional elevation on line A—A, Fig. 2. Fig. 4 is a sectional plan on the line C—C, of Fig. 1, and Fig. 5, is a sectional plan on the line B—B of Fig. 1.

Referring to the drawing, a valve 1 opening inwardly is provided upon any convenient part of the combustion chamber 2, and is normally held upon its seat by a spring 3, which surrounds the valve stem 4 and is in compression between the cap 5 of the valve chamber 4ª and a collar 7 fixed to the valve stem 4. The valve is operated by a rocker 6 pivoted upon a pin 8 and receiving motion by a rod 6ª from a cam 9 fixed upon the cam shaft 6ᵇ. The cap 5 has perforations 5ª for the passage of air to the valve chamber 4ª.

The cam 9 is timed to operate the valve 1 so that admission of air to the combustion chamber follows after the expulsion of waste gases from the cylinder. The admission and expulsion of air through the valve 1 to the combustion chamber and cylinder causes cool air from outside the engine to pass into and out of the combustion chamber and cylinder, whereby the rise in temperature of these parts is checked, and the waste products of combustion are expelled, and the formation of carbon deposits is prevented.

The valve chamber 4ª above referred to may be used during the starting of the engine, as a priming cup, thereby securing a double function for this member.

In operating the engine, the ordinary exhaust valve 10, controlled by the rotation of the cam 11, on shaft 6ᵇ, may be used as the air exhaust if desired, or the air may be admitted and exhausted through the valve 1. The valve 13 controlled by another cam on the shaft 6ᵇ, is the inlet for the mixture of air and combustible gas or vapor.

What we claim is:

1. In an internal combustion engine, the combination with a cylinder and piston, of a valve opening inwardly, at the explosion end of said cylinder, means for opening said valve at about the time when the exhaust of the burned gas charge has taken place, and for seating said valve prior to the admission of a fresh charge of explosive mixture, said means including a spring actuated valve, a valve chamber freely open to the atmosphere forming an air inlet to said valve, said air chamber having a detachable spider across the top thereof, against which one end of the spring for closing the valve rests.

2. In a six-cycle internal combustion engine, a vertical cylinder having inlet and exhaust ports at its side, and having an air inlet and exhaust port at its top, an inwardly opening valve to said air inlet and exhaust port and means for opening said valve at about the time when the exhaust of the burned gas charge has taken place, and for seating said valve prior to the admission of a fresh charge of explosive mixture, said means including a spring actuated valve, a valve chamber freely open to the atmosphere, forming an air inlet to said valve, said air chamber having a detachable spider across the top thereof, against which one end of the spring for closing the valve rests.

In testimony whereof we have signed our names to this specification in the presence of two witnesses.

ARTHUR FLOYD COLLINS.
ALEXANDER KERR.
ALBERT EDWARD RUSSELL.

Witnesses:
E. M. KERR,
G. A. J. HART.

Copies of this patent may be obtained for five cents each, by addressing the " Commissioner of Patents, Washington, D. C."